Patented Aug. 6, 1946

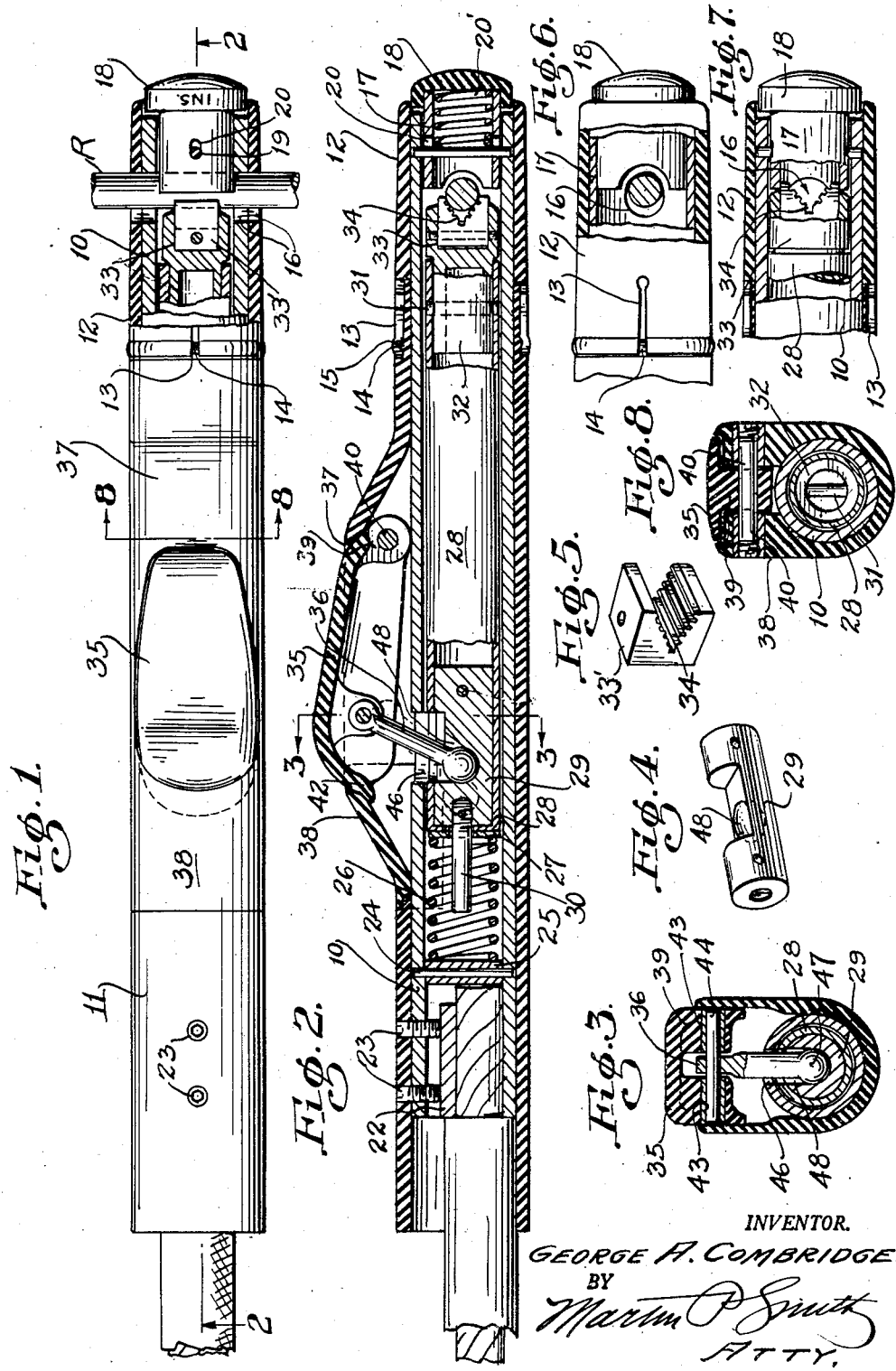

2,405,406

UNITED STATES PATENT OFFICE 2,405,406

WELDING ROD HOLDER

George A. Combridge, Los Angeles, Calif.

Application March 15, 1944, Serial No. 526,531

6 Claims. (Cl. 219—8)

My invention relates to welding rod holders of the particular type disclosed in U. S. Letters Patent No. 2,295,546 issued to me, September 15, 1942, and the principal objects of my invention are, to generally improve upon and simplify the construction of the welding rod holder set forth in my above identified patent as well as other similar holders, to provide simple and efficient means for firmly gripping and clamping the inserted welding rod, and for readily and positively releasing and expelling the stub or unused end of the rod and further, to provide simple, strong and highly effective means, including a manually operable pressure plate for releasing a part of the rod gripping means, in order to facilitate the "kicking" out or expelling of the unused stub of the welding rod.

A further object of my invention is, to provide a welding rod holder of the character referred to, which is of strong, sturdy structure, well able to withstand the rough usage to which such tools are ordinarily subjected and further, to provide a holder of streamlined contour, so as to afford convenience to the user's hand while the tool is being held and manipulated during welding operations, and, at the time, offering no obstruction when the cable and tool carried thereby are dragged from one point of use to another.

With the foregoing and other objects in view, my invention consists in certain novel features of construction and arrangement of parts which will be hereinafter more fully described and claimed and illustrated in the accompanying drawing in which:

Fig. 1 is a top plan view of my improved welding rod holder, with the forward portion thereof in horizontal section.

Fig. 2 is a vertical longitudinal section taken on the line 2—2 of Fig. 1.

Fig. 3 is a cross section taken on the line 3—3 of Fig. 2.

Fig. 4 is a perspective view of a socket member that is mounted in the rear portion of the sliding core.

Fig. 5 is a perspective view of the welding rod gripping tooth.

Fig. 6 is a side elevational view of the forward portion of the nose piece broken away.

Fig. 7 is a longitudinal section taken through the nose piece.

Fig. 8 is a cross section taken on the line 8—8 of Fig. 1.

Referring by numerals to the accompanying drawing which illustrates a preferred embodiment of my invention, 10 designates an electrode composed of metal having a high degree of conductivity, for instance, copper or hard drawn aluminum and said electrode being in the form of a tube so as to provide the desired strength, rigidity, high electrical conductivity and ample heat dissipation.

Enclosing the greater portion of electrode 10 is a tubular member of suitable plastic insulation which functions as the tool handle and said member extends a short distance rearwardly from the forward end of said electrode.

Enclosing that portion of the electrode which projects forwardly of handle 10 is a tubular nose piece 12 of suitable fire resistant plastic insulation which gradually tapers toward its forward end, and the rear portion of the wall of said nose piece is provided with three or four short longitudinal slots such as 13, in order that said rear portion may expand slightly when applied to or removed from the forward end of the tool, and detachably secured thereto, by the engagement of an annular rib 14 on the forward portion of the handle, in a corresponding internal groove 15, within the rear end of the nose piece.

The construction just described, enables an old, worn, or broken nose piece to be readily removed and replaced by a new one.

Formed through the wall of the electrode 10 near its forward end and through the wall of nose piece 12 are coinciding diametrically arranged apertures 16 substantially oval or egg-shaped with their major axes longitudinally disposed and arranged for sliding movement within the forward portion of the electrode in front of these apertures is a short tubular member 17 of metal on the outer end of which is mounted a cap or knob 18 of fire resistant insulation.

The ends of a pin 19 are seated in the wall of the electrode and pass through short longitudinally disposed slots 20 in tube 17, which arrangement limits the sliding movement of the tube into the electrode.

Arranged with tube 17 between pin 19 and knob 18 is an expansive coil spring 20 which normally maintains tube 17 at its outer limit of movement and with the notched inner end 21 of said tube just clear or approximately $\frac{1}{16}$ of an inch in front of ends of the welding rod apertures 16. The construction just described provides simple and efficient means for "kicking" the welding rod stub away from the forward ends of the apertures 16 in the electrode 10 when said stub is expelled from the tool, and the clearance between the tube 17 and apertures 16 may be seen in Fig. 2.

The electric current supply cable may be permanently secured to the rear end of the electrode by soldering the bare end of said cable to said electrode, within the rear end of handle 11, or as illustrated in Fig. 2, the cable may be detachably connected to the electrode by means of a clamping plate 22 which is moved into gripping engagement with the cable by screws 23 seated in handle 11.

Secured within the rear portion of electrode 10 by means of a diametrically arranged pin 24 is a disk 25 against which bears the rear end of an expansive coil spring 26.

The forward end of this spring bears against a disk 27 and the latter bears against the rear ends of a tubular core 28 of metal and a socket block 29 which is heated within the rear end of said core.

Seated in the rear end of block 29 and projecting through disk 27 and partly through spring 26 is an axial centering rod or pin 30.

Secured within the forward portion of core 28, preferably by a diametrically disposed pin 31, is a short tubular member 32, on the outer end of which is formed a socket 33, within which is detachably secured a welding rod gripping tooth 33'. This tooth of hardened metal, preferably steel is, provided in its front face with a V-shaped notch 34, the faces of which are ribbed or serrated so as to very firmly and securely grip welding rods. This notch occupies a position adjacent the rear portions of the apertures 16.

Core 28 is mounted so as to move freely lengthwise in the tubular electrode and to retract or move same rearwardly against the resistance offered by spring 26, a hand pressure plate 35 and a toggle link or lever 36 are operatively associated with block 29.

At or near the center of the tool, the wall of the tubular handle 11 is extended a short distance upwardly in front and to the sides of a substantially oval opening, as designated by 37 and a short inclined wall section 38 of insulation, is removably attached to the handle to the rear of said opening and the side walls 37, thus facilitating assembly of the parts 35 and 36.

Plate 35 is provided with depending side walls which are positioned just inside walls 38 and the forward end of said plate is curved downward so as to fit snugly beneath the rear edge of inclined front wall 37.

Formed integral with the forward end of plate 35 is a dependant ear 39 in which is seated a transversely disposed hinge pin 40, the end portions of which bear in metal bearings 41 seated in the side walls 38.

The rear end of plate 35 terminates in a downwardly curved lip 42, which normally bears against the under side of the forward end of plate 38 and depending from the portion of said plate are ears in which are seated transversely aligned metal bearings 43.

Mounted to rotate in bearings 43 are the ends of a transverse pin 44 carried by the upper end of the toggle link or lever 36.

This link which normally occupies a rearwardly inclined position extends downward through a slot 46 and the lower end of said lever terminates in a spherical member 47 which bears in a substantially spherical recess 48 in the central portion of block 29.

The provision of extra length bearings for the pins 40 and 44, insures firmness of position for the pressure plate 35 at all times and counteracts any tendency of side lash of said plate and its connections to block 29 and core 28, when said plate is actuated.

When ready for use, the various parts of the tool occupy the positions as illustrated in Figs. 1 and 2 with a welding rod such as R passing through the apertures 16 and said rod firmly engaged by and gripped against the forward edges of the apertures 16 in electrode 10 by the serrated edges of tooth 33. Tooth 33 carried by core 28 is forced into gripping engagement with rod R by the spring 26 and thus the rod is firmly held by the tool to be used in conventional manner in performing welding operations.

It frequently happens that the stub or portion of the holder after the greater portion of said rod has been melted during welding operations, sticks to the electrode at the forward ends of the apertures 16 therein.

In order to dislodge the stub, under such conditions and "kick" or expel same from the holder, plate 35 is manually depressed so as to swing on its axis, the pin 40, and through movement of link 36, block 29 and core 28, carrying at its forward end the rod engaging tooth 33, will be moved rearwardly through the electrode against the resistance of spring 26. Such movement disengages tooth 34 from the stub of the rod and to loosen the latter from the electrode knob 18 is struck with a quick movement, the length of slot 20, and such action "kicks" the stub off said electrode and said stub leaves the tool by dropping through one of the pairs of the apertures 16.

One of the particularly desirable features of my invention is, the means comprising the parts 17, 18 and 20 which constitute what I term a "kicker" for effectively dislodging and removing those stubs of the welding rod which tend to stick to the electrode.

The kicker when at rest, has no contact with the welding rod and moves a very short distance, possibly $\frac{1}{16}$ or $\frac{3}{32}$ of an inch when forced inward to dislodge the stub, which action and desirable results are attained instantly, by delivering a light blow with the palm or heel of the hand against knob 18, and thus much time and labor are saved and the efficiency of the tool greatly increased.

Apertures 16 are of such size as to receive all standard and usable sizes of welding rods.

Thus it will be seen that I have provided a welding rod holder which is simple, strong and durable in structure, inexpensive of manufacture, capable of being easily and quickly assembled or taken apart and very effective in performing the functions for which it is intended.

It will be understood that minor changes in the size, form and construction of the various parts of my improved welding rod holder may be made and substituted for those herein shown and described without departing from the spirit of the invention, the scope of which is set forth in the appended claims.

I claim as my invention:

1. In a welding rod holder, a handle, a tubular electrode within said handle, a tubular core shiftable within said electrode for receiving and gripping welding rods, a block seated in the rear portion of said core, a hand pressure plate hinged to said handle and a toggle lever pivoted to said pressure plate and having ball and socket engagement with said block.

2. A welding rod holder as set forth in claim 1 and spring biased manually operable means arranged for sliding movement in the forward end of said electrode for dislodging welding rods therefrom.

3. In a welding rod holder, an electrode provided with a transverse aperture for receiving a welding rod, a spring held member arranged for sliding movement in said electrode, a block removably seated in the forward end of said sliding member, which block is provided in its forward end with a V-shaped notch and teeth formed on the inclined faces of said notch.

4. The welding rod holder as set forth in claim 3, with a shell of insulation for said electrode, a handle of insulation pivoted to said shell and a toggle link between said handle and spring held member.

5. The welding rod holder as set forth in claim 3 and the dimension of said aperture lengthwise of the electrode being greater than the diameter of the welding rods received by said aperture.

6. The welding rod holder as set forth in claim 3 including a spring held plunger arranged for sliding movement in the forward end of said electrode for moving welding rod stubs rearwardly in said aperture.

GEORGE A. COMBRIDGE.